United States Patent
Bayer et al.

(10) Patent No.: US 6,942,304 B1
(45) Date of Patent: Sep. 13, 2005

(54) ELECTRONICALLY CONTROLLABLE BRAKE ACTUATING SYSTEM

(75) Inventors: Ronald Bayer, Mühleheim (DE); Bernhard Schmittner, Aschaffenburg (DE); Christian Albrich Von Albrichsfeld, Darmstadt (DE); Ulrich Neumann, Rossdorf (DE); Andreas Klein, Bad Homburg (DE); Johann Jungbecker, Bodenheim (DE); Robert Mutschler, Mundelsheim (DE); Stefan Fritz, Erzhausen (DE); Manfred Rüffer, Sulzbach (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/601,906
(22) PCT Filed: Feb. 4, 1999
(86) PCT No.: PCT/EP99/00720

§ 371 (c)(1),
(2), (4) Date: Jan. 29, 2001

(87) PCT Pub. No.: WO99/41125

PCT Pub. Date: Aug. 19, 1999

(30) Foreign Application Priority Data

Feb. 10, 1998 (DE) .......................... 198 05 244

(51) Int. Cl.$^7$ ................................................ B60T 8/32
(52) U.S. Cl. .................. 303/191; 73/19.1; 73/19.01
(58) Field of Search ............................ 303/190, 191; 188/152, 352; 73/19.01, 19.1, 19.11

(56) References Cited

U.S. PATENT DOCUMENTS

| | | | | |
|---|---|---|---|---|
| 4,100,792 A | * | 7/1978 | Leiber ......................... | 303/122 |
| 5,449,226 A | * | 9/1995 | Fujita et al. ............. | 303/116.4 |
| 5,605,385 A | * | 2/1997 | Zaviska et al. ................ | 303/11 |
| 5,620,241 A | * | 4/1997 | Burgdorf .................. | 303/113.5 |
| 5,767,397 A | * | 6/1998 | Eisele ......................... | 340/452 |
| 5,908,983 A | * | 6/1999 | Binder ......................... | 73/129 |
| 6,081,767 A | * | 6/2000 | Witt et al. ..................... | 702/50 |
| 6,113,197 A | * | 9/2000 | Kuroki et al. ................. | 303/11 |

FOREIGN PATENT DOCUMENTS

| | | |
|---|---|---|
| DE | 40 14 314 | 12/1991 |
| DE | 195 03 909 | 8/1997 |
| DE | 196 03 863 | 8/1997 |
| DE | 196 03 867 | 8/1997 |
| DE | 196 03 909 | 8/1997 |
| EP | 0 157 309 | 10/1985 |
| WO | 91 17073 | 11/1991 |
| WO | 97 32766 | 9/1997 |

OTHER PUBLICATIONS

Jonner et al.: "Electrohydraulic Brake System—The First Approach to Brake–by–Wire Technology"; *SAE 1996 Transactions Journal of Passenger Cars* (Paper # 960991); vol. 105, Ed. 6, p. 1368–1375 (1996).

* cited by examiner

*Primary Examiner*—Robert A. Siconolfi
(74) *Attorney, Agent, or Firm*—Honigman Miller Schwartz and Cohn LLP

(57) ABSTRACT

The present invention discloses an electronically controllable brake actuating system for automotive vehicles, including an unpressurized pressure fluid supply reservoir, a pressure source actuatable by an electronic control unit, the pressure of which can be applied to wheel brakes of the vehicle, further including a device for detecting the driver's wish for deceleration as well as valve assemblies inserted upstream of the wheel brakes and connecting the wheel brakes alternatively to the pressure source or the pressure fluid supply reservoir. In order to increase the operational or functional reliability of a system of this type, the present invention discloses the provision of means for detecting gases or air disposed in the system.

8 Claims, 3 Drawing Sheets

ELECTRONICALLY CONTROLLABLE BRAKE ACTUATING SYSTEM

TECHNICAL FIELD

The present invention relates generally to vehicle brakes and more particularly relates to an electronically controllable brake actuating system for automotive vehicles.

BACKGROUND OF THE INVENTION

A brake actuating system of this general type is disclosed, for example, in the article 'Electrohydraulic Brake System—The First Approach to Brake-By-Wire Technology', SAE Papers 960991. The valve assemblies of the prior art brake actuating system which are connected upstream of the wheel brakes are configured as two-way/two-position directional control valves in slide-type construction and arranged in pairs, with the inlet valve inserted into the connection between the pressure source and the wheel brakes fulfilling a pressure-limiting function in its first switch position and releasing the connection in its second switch position. The outlet valve that is inserted into the connection between the wheel brakes and the pressure fluid supply reservoir is configured as a normally closed valve which closes the connection in its first switch position and opens it in its second switch position.

The above-mentioned publication, however, does not indicate any provisions which could eliminate or at least greatly reduce malfunctions which are caused in the prior art brake system, e.g. by gas bubbles or air bubbles.

Therefore, an object of the present invention is to improve upon an electronically controllable brake actuating system of the initially mentioned type to such effect as to greatly enhance the reliability in operation and functioning.

According to the present invention, this object is achieved by the provision of means for detecting gases or air disposed in the system.

To render the idea of the present invention more precise, the means is provided by a hydraulic arrangement which permits applying a defined pressure fluid volume to at least one wheel brake, with a pressure sensor being arranged for sensing the pressure rise which is caused in the wheel brake by the effect of the pressure fluid volume. Monitoring is thereby achieved with each actuation.

In an especially favorable improvement of the brake actuating system of the present invention, the arrangement is configured as a piston-and-cylinder unit which is interposed between the pressure source and the associated wheel brake, and a valve assembly is provided in a line that leads from the pressure source to the piston-and-cylinder unit and permits closing of the line.

Preferably, a line communicating with the pressure fluid supply reservoir and accommodating a restrictor is interposed between the valve assembly and the piston-and-cylinder unit.

In another favorable embodiment of the present invention wherein the pressure source includes a hydraulic accumulator with a movable media separating element, the hydraulic arrangement is provided by the accumulator, and there is provision of a travel sensor device for sensing the travel of the movable media separating element, the output signal of which corresponds to the defined pressure fluid volume.

In still another favorable embodiment of the subject matter of the present invention, the pressure source is arranged in a reservoir filled with pressure fluid and the accumulator housing has bores which permit the delivery of the pressure fluid into an unpressurized chamber that is defined in the accumulator housing by the movable media separating element.

To detect damage of the above-mentioned accumulator whose media separating element separates a chamber filled with a pressure fluid under high hydraulic pressure from a chamber filled with gas, a favorable aspect of the present invention arranges for the media separating element to be configured as a metal diaphragm and the pressure that prevails in the chamber filled with pressure fluid to be significantly higher than the gas pressure. The difference in pressure is preferably caused by the preload of the metal diaphragm or the additional force of a spring which acts upon the metal diaphragm. It is ensured by the mentioned provisions that in the event of leakage of the metal diaphragm an exchange of media will take place only from the pressure fluid side to the gas side.

In another favorable aspect of the object of the present invention, another possibility of sensing the leaky condition includes that the metal diaphragm has a double wall design and that a media sensor is fitted in the area between both walls which responds to pressure fluid and to gas.

The present invention will be explained in detail in the following description by way of two embodiments making reference to the accompanying drawings. In the drawings,

DETAILED DESCRIPTION OF THE PREFERRED EMBODIMENTS

Figure 1:
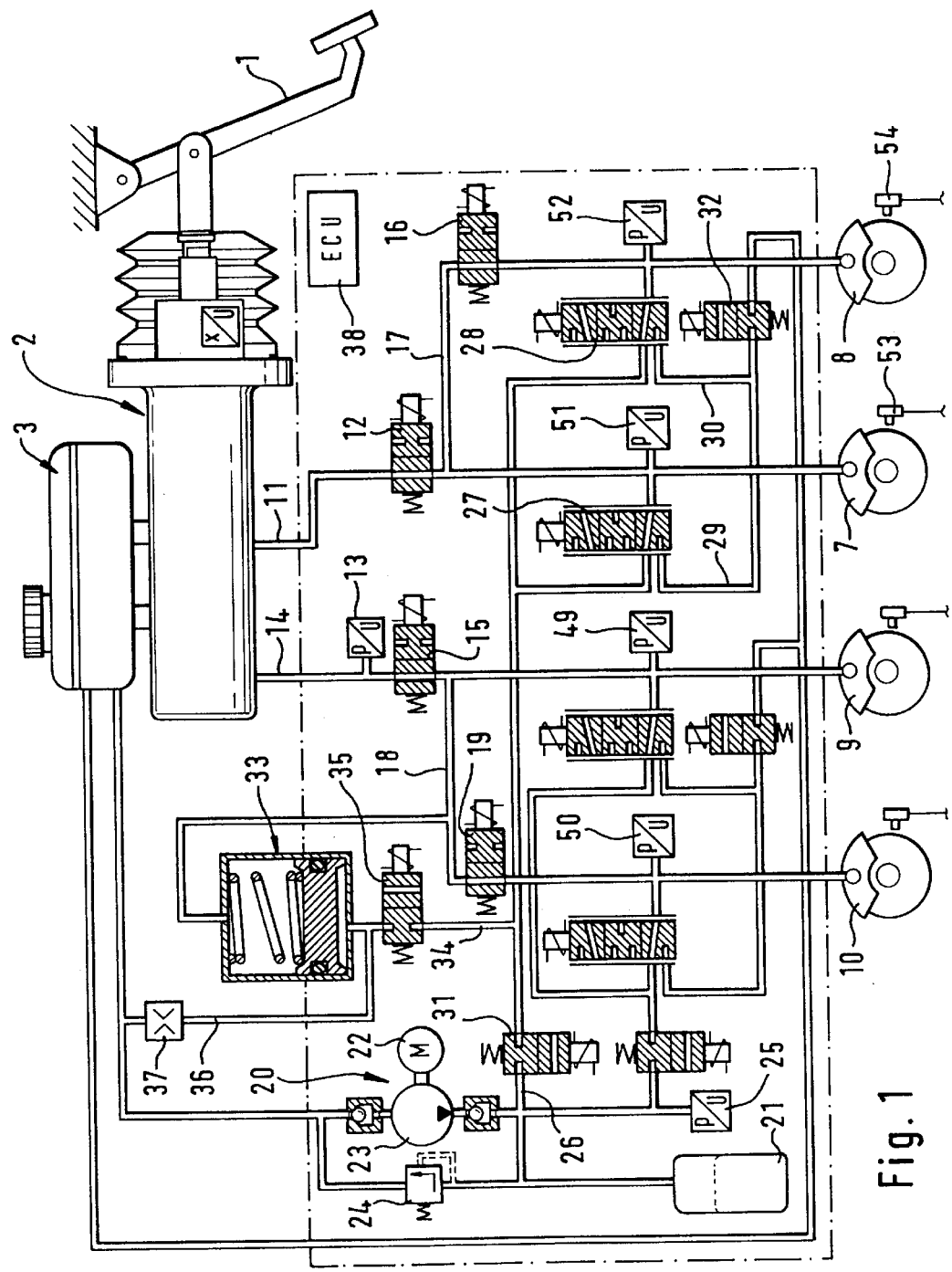
FIG. 1 is a circuit diagram of a first design of the brake actuating system of the present invention.

The electronically controllable brake actuating system of the present invention, as shown in the drawings, is comprised of a dual-circuit master brake cylinder or tandem master cylinder 2 which is operable by means of an actuating pedal 1, cooperates with a pedal travel simulator, and includes two pressure chambers separated from each other and connected to an unpressurized pressure fluid supply reservoir 3. Connected to the first pressure chamber (primary pressure chamber) by way of a closable first hydraulic line 11 is a wheel brake 7 associated with the front axle and a wheel brake 8 associated with the rear axle, for example. Line 11 is shut off by means of a first separating valve 12, while in the line portion 17 that leads to the wheel brake 8 an electromagnetically operable, preferably normally open (NO) pressure compensating valve 16 is inserted which permits braking pressure control individually per wheel, if necessary.

The second pressure chamber of the master brake cylinder 2 to which a pressure sensor 13 can be connected is connectable to the other wheel brake pair 9, 10 by way of a second hydraulic line 14 that can be closed by means of a second separating valve 15. In turn, an electromagnetically operable, preferably normally open (NO) pressure compensating valve 19 is inserted into the line portion 18 leading to the wheel brake 10. Because the design of the hydraulic circuit connected to the second pressure chamber of the master brake cylinder 2 is identical to the brake circuit 11 that has been described hereinabove, there is no need for further explanations in the following text.

As can be seen in the drawings, a motor-and-pump assembly 20 used as an auxiliary-pressure source is provided with a high-pressure accumulator 21 which, in turn, includes a pump 23 driven by an electric motor 22 and a pressure-limiting valve 24 connected in parallel to the pump 23. The suction side of the pump 23 is connected to the above-mentioned pressure fluid supply reservoir 3 by way of a non-return valve that is not referred to in detail, while the hydraulic pressure generated by the pump 23 is monitored by a pressure sensor 25.

A third hydraulic line 26 connects the pressure side of the pump 23 or the high-pressure accumulator 21 to first inlet ports of two electromagnetically operable three-way/three-position slide valves 27, 28 which are connected upstream of the wheel brakes 7 and 8. Connected to second inlet ports of the slide valves 27, 28 is one hydraulic line 29, 30 respectively, being in connection to the unpressurized pressure fluid supply reservoir 3, on the other hand. Inserted into the line 26 that leads to the three-way/three-position slide valve 27, 28 is a first on-off seat valve 31 which is preferably configured as a normally closed (NC) electromagnetically operable two-way/two-position directional control valve. Connected in line 29 or 30 leading to the pressure fluid supply reservoir 3 is a second on-off seat valve 32, the design of which corresponds to that of the first valve 31. Connected to the outlet port of the three-way/three-position directional control valve 27, 28 is the above-mentioned line 11 or 17 that leads to the wheel brake 7 or 8 as well as each one pressure sensor 51, 52 with the aid of which the hydraulic pressure is determined that prevails in the wheel brake 7, 8.

The joint actuation of the motor-and-pump assembly 20 and the electromagnetic valves 12, 15, 16, 19, 27, 28, 31, 32 is performed by an electronic control unit 38 to which are sent, as input signals, the output signals of an actuating travel sensor 36 that cooperates with the actuating pedal 1 and those signals of the above-mentioned pressure sensor 13, and which permit detecting the driver's wish for deceleration. However, other means, such as a force sensor sensing the actuating force at the actuating pedal 1, can also be used for the detection of the driver's wish for deceleration. The output signals of the pressure sensors 25, 51 and 52 and the output signals of wheel sensors (shown only schematically) corresponding to the speed of the vehicle are sent to the electronic control unit 38 as further input quantities, with the wheel sensors associated with the wheel brakes 7, 8 being designated by reference numerals 53, 54.

To permit detecting air that might be in the system, there is provision of a hydraulic arrangement or a piston-and-cylinder unit 33 which is connected to the above-mentioned hydraulic line 26 downstream of the on-off seat valve 31, on the one hand, and to the line 18 that leads to the wheel brake 9, on the other hand. The line portion 34 between the line 26 and the piston-and-cylinder unit 33 is closable by means of a preferably normally closed (NC) third on-off seat valve 35. Another line 36 in which a restrictor 37 is inserted is connected to the line portion that leads from the third on-off seat valve 35 to the piston-and-cylinder unit 33, on the one hand, and to the line that leads from the pressure fluid supply reservoir 3 to the motor-and-pump assembly 20, on the other hand.

Due to the change-over of the on-off seat valves 31 and 35 on command of control signals of the control unit 38, the piston of the piston-and-cylinder unit 33, which is not referred to in detail, is acted upon by the pressure that prevails in the high-pressure accumulator 21 and displaces by its movement a defined pressure fluid volume into the wheel brakes 9, 10. The pressure sensors 49, 50 connected to the wheel brakes 9, 10 determine a pressure value responsive to the pressure fluid volume. In case the pressure value determined does not correspond to a previously fixed relationship between volume and pressure, air or gas prevails in the system. This must be signaled for safety reasons.

Figure 2:
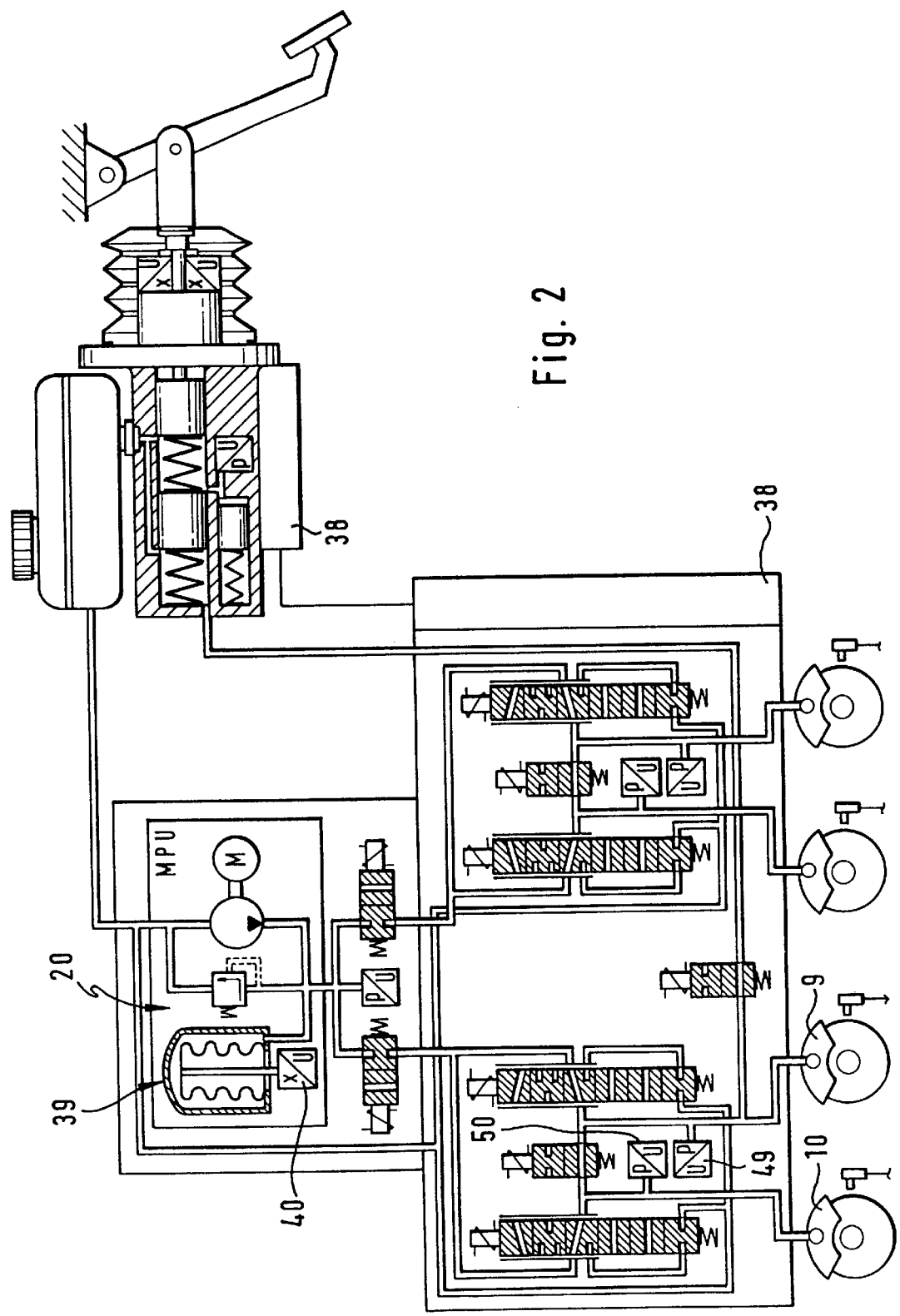
FIG. 2 is a circuit diagram of a second design of the brake system of the present invention.

In the second embodiment shown in FIG. 2, a travel detection device, such as a travel sensor 40, is used to detect the air prevailing in the system. Sensor 40 senses the actuating stroke or travel of the media separating element of the high-pressure accumulator mentioned with respect to FIG. 1. The media separating element (not illustrated) of the high-pressure accumulator 39 shown in FIG. 2 is configured as a metal diaphragm. The above-mentioned pressure fluid volume that is required for the pressure increase in the wheel brakes is derived from the sensed travel of the metal diaphragm. The information about the pressure fluid volume is used together with the information about the hydraulic pressure introduced into the wheel brakes for the comparison with the stored volume-pressure characteristic curve.

Figure 3:
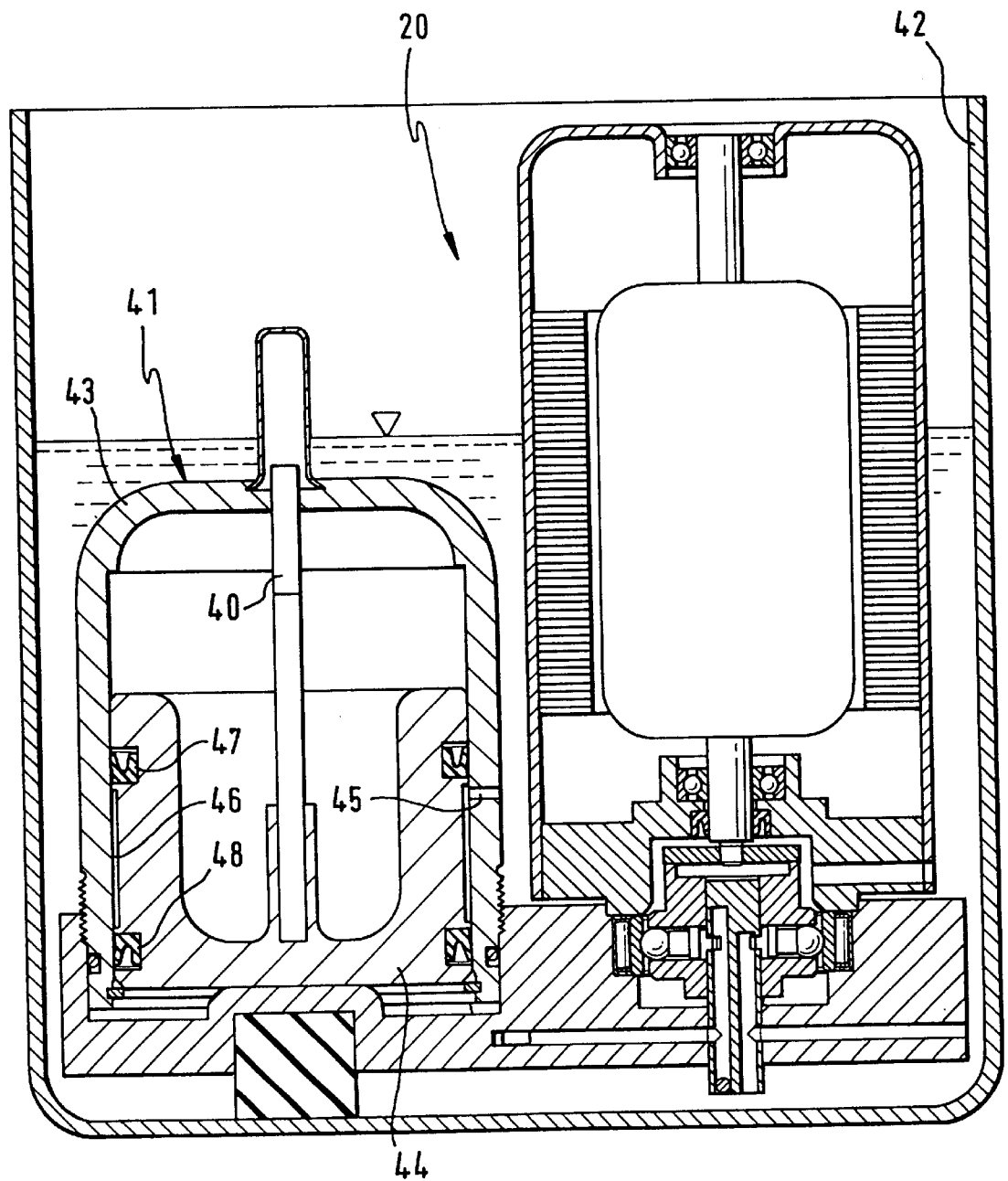
FIG. 3 is a design of a pressure source which can be used in the brake actuating system according to FIG. 2.

The hydraulic high-pressure accumulator is configured as a piston-type accumulator 41 in the design of the above-mentioned pressure source 20 shown in the embodiment of FIG. 3. The pressure source 20 is preferably arranged in a reservoir 42 filled with pressure fluid. The housing 43 of the piston-type accumulator 41 includes supply bores 45 which open into an unpressurized chamber 46 bounded in the housing 43 by seals 47, 48 arranged on the piston 44. Air is thereby prevented from propagating into the system by way of seals 47, 48. It is another advantage that the seals 47, 48 are permanently kept in a humid condition, with the result that their useful life is considerably prolonged.

What is claimed is:

1. Electronically controllable brake actuating system for automotive vehicles, comprising:

means for measuring fluid pressure exerted by a pressure fluid, means for measuring volume change of the pressure fluid, a hydraulic arrangement including a piston-and-cylinder unit responsive to a pressure fluid pressure at an input thereto and in response to the pressure fluid pressure displaces a defined volume of pressure fluid and is interposed between a pressure source and an associated wheel brake and includes a pressure sensor arranged for sensing a pressure rise which is associated with the displaced volume of pressure fluid.

2. Electronically controllable brake actuating system as claimed in claim 1, wherein a valve assembly is provided in a first line that leads from the pressure source to the piston-and-cylinder unit and permits closing of the first line.

3. Electronically controllable brake actuating system as claimed in claim 2, further including a second line interposed between the valve assembly and the piston-and-cylinder unit wherein said second line communicates with a pressure fluid supply reservoir and a restrictor.

4. Device for detecting the presence of compressible fluid mixed with non-compressible fluid in the brake system of a vehicle, comprising:

a piston-and-cylinder unit interposed between a pressure source and an associated wheel brake, wherein said piston-and-cylinder unit is responsive to a pressure fluid pressure at an input thereto and in response to the pressure fluid pressure detects gases or air disposed in the system, by permitting the application of a defined pressure fluid volume to at least one wheel brake, a pressure sensor arranged for sensing the pressure rise which is caused in the wheel brake by the effect of the pressure fluid volume, and a valve assembly is provided in a line that leads from the pressure source to the piston-and-cylinder unit and permits closing of the line.

5. Electronically controllable brake actuating system for automotive vehicles, comprising:

a pressure source;

a valve assembly is provided in a first line that leads from the pressure source to a piston-and-cylinder unit wherein the piston is responsive to a pressure fluid pressure at an input to the piston-and-cylinder unit for determining hydraulic pressure to at least one wheel brake and wherein the valve assembly permits closing of the first line;

a pressure fluid supply reservoir in communication with a second line interposed between the valve assembly and the piston-and-cylinder unit;

wherein an amount of gases in the system is determined from a volume-pressure characteristic curve.

6. Electronically controllable brake actuating system as claimed in claim 5, further comprising a travel sensor for sensing an amount of travel of the piston.

7. Electronically controllable brake actuating system as claimed in claim 5, wherein said pressure fluid supply reservoir comprises a piston-type accumulator arranged in a reservoir filled with pressure fluid.

8. Electronically controllable brake actuating system as claimed in claim 7, wherein said piston-type accumulator includes supply bores that open into an unpressurized chamber contained in a sealed housing for preventing propagation of unwanted gases into the system.

* * * * *